(12) United States Patent
Tatapudi et al.

(10) Patent No.: US 7,830,887 B2
(45) Date of Patent: Nov. 9, 2010

(54) METHOD AND APPARATUS FOR DIRECT MEMORY ACCESS BASED ON CLASS-OF-SERVICE

(75) Inventors: Vamsi Tatapudi, Santa Clara, CA (US); Nithyananda Miyar, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1334 days.

(21) Appl. No.: 11/082,975

(22) Filed: Mar. 18, 2005

(65) Prior Publication Data

US 2006/0114937 A1 Jun. 1, 2006

Related U.S. Application Data

(60) Provisional application No. 60/631,575, filed on Nov. 30, 2004.

(51) Int. Cl.
*H04L 12/28* (2006.01)
(52) U.S. Cl. .................. 370/395.21; 370/431; 370/469
(58) Field of Classification Search .............. 370/229, 370/264, 395.21
See application file for complete search history.

(56) References Cited

U.S. PATENT DOCUMENTS

| | | | | |
|---|---|---|---|---|
| 6,560,198 | B1 * | 5/2003 | Ott et al. | 370/235 |
| 7,042,842 | B2 * | 5/2006 | Paul et al. | 370/229 |
| 7,106,731 | B1 * | 9/2006 | Lin et al. | 370/389 |
| 2002/0085551 | A1 * | 7/2002 | Tzeng | 370/389 |
| 2003/0154328 | A1 * | 8/2003 | Henderson et al. | 710/1 |
| 2003/0227865 | A1 * | 12/2003 | Kratochwil et al. | 370/201 |
| 2004/0141521 | A1 * | 7/2004 | George | 370/463 |
| 2005/0157721 | A1 * | 7/2005 | Rabie et al. | 370/392 |
| 2008/0198814 | A1 * | 8/2008 | Wengerter et al. | 370/336 |

* cited by examiner

*Primary Examiner*—Chirag G Shah
*Assistant Examiner*—Salvador E Rivas
(74) *Attorney, Agent, or Firm*—Brake Hughes Bellermann LLP

(57) ABSTRACT

A switching chip for performing switching and other functions on packets transmitted through the switching chip. The switching chip includes a memory management unit that identifies a class of service to which each packet belongs, wherein upon processing the packet. The memory management unit transmits the packet to a CPU through a CPU processing module. The switching chip also includes a CPU processing module that includes a class of service bitmap that is associated with a plurality of channels. Each of the plurality of channels is further associated with at least one class of service, includes a per channel bit and is assigned a predefined priority level. Upon receiving packets from the memory management unit, the CPU processing module is configured to sort the packets according to the class of service to which the packet belongs and store each packet in an associated one of the plurality of channels. The CPU processing module is also configured to use the per channel bit to determine how to process packets in each for the plurality of channels for which there is no available CPU buffer. When there is no available CPU buffer for one of the plurality of channels, the CPU processing module is configured to set an appropriate bit in the class of service bitmap and transmits the class of service bitmap to the memory management unit.

20 Claims, 3 Drawing Sheets

METHOD AND APPARATUS FOR DIRECT MEMORY ACCESS BASED ON CLASS-OF-SERVICE

This application claims priority of U.S. Provisional Patent Applications Ser. No. 60/631,575, filed on Nov. 30, 2004. The subject matter of the earlier filed application is hereby incorporated by reference.

BACKGROUND OF THE INVENTION

1. Field of the Invention

The present invention relates to a method of accessing memory locations on a network device and more particularly to a method for accessing memory locations based on a class of service associated with packets transmitted through the network device.

2. Description of the Related Art

A switching system may include one or more network devices, such as a switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching is performed on the packets. Thereafter, the packets are transmitted to the MMU for distinguishing a Class of Service (COS) to which each packet belongs. According to one design, there are eight classes. As such, the MMU may send each packet to one of eight logical areas. After performing resource checks on the packets, the packets are transmitted to the egress module for further processing and modification. Thereafter, the egress module transmits the packets to at least one destination port, possibly including a CPU port. If the packets are being transmitted to the CPU port, the egress module forwards them through a CMIC module which sorts the packets based on the COS associated with each packet.

When packets enter the CMIC module, they are recognized to be of different priorities. For example, some packets may be recognized to be of a higher priority and others may be recognized to be of a lower priority. Thereafter, the CMIC module transmits the packets to buffers on the CPU via a PCI bus. Prior to transmitting the packets to the CPU buffers, the CMIC module pre-fetches the required packets from the MMU. So if the CPU buffer has, for example 10 slots, the CMIC module pre-fetches each of packets 1-10 and transmits them to the CPU buffer. By the time the CMIC module sends the $10^{th}$ packet to the CPU buffer, the MMU may already be transmitting the $11^{th}$ packet to the CMIC module to maximize the performance of the device. However, since the CPU buffer only has 10 slots, the CMIC module has no where to transmit the $11^{th}$ packet until software in the CPU clears the buffer and requests additional packets. Hence, the CMIC module is stalled until the software processes the 10 packets that are already in the CPU buffer.

In some current devices, a bit may be set to either drop or block packets that are stalled in the CMIC module. If the bit is set to drop packets, the CMIC module drops all packets that are stalled, whether or not those packets are recognized to be of a higher priority or a lower priority. If the bit is set to block packets, packets that are recognized to be of lower priority may block higher priority packets and higher priority packets may block lower priority packets. In the situation described above, lower priority packets may be transferred to the CPU buffer while higher priority packets are stalled in the CMIC module. As such, the CMIC may drop higher priority packets while allowing lower priority packets to be forwarded to the CPU.

BRIEF SUMMARY OF THE INVENTION

According to one aspect of the invention, there is provided network device for processing packets. The network device includes a memory management unit that identifies a class of service to which each packet belongs, wherein upon processing the packet. The memory management unit transmits the packet to a CPU through a CPU processing module. The network device also includes a CPU processing module that includes a class of service bitmap that is associated with a plurality of channels. Each of the plurality of channels is further associated with at least one class of service, includes a per channel bit and is assigned a predefined priority level. Upon receiving packets from the memory management unit, the CPU processing module is configured to sort the packets according to the class of service to which the packet belongs and store each packet in an associated one of the plurality of channels. The CPU processing module is also configured to use the per channel bit to determine how to process packets in each of the plurality of channels for which there is no available CPU buffer. When there is no available CPU buffer for one of the plurality of channels, the CPU processing module is configured to set an appropriate bit in the class of service bitmap and transmits the class of service bitmap to the memory management unit.

According to another aspect of the invention, there is provided a method for processing packets on a network device. The method includes the steps of receiving packets in a memory management unit that identifies a class of service to which each packet belongs and transmitting the packet to a CPU through a CPU processing module. The method also includes the steps of sorting the packets, in the CPU processing module, according to the class of service to which the packet belongs, storing each packet in an associated one of the plurality of channels and using a per channel bit associated with each of the plurality of channels to determine how to process packets in each for the plurality of channels for which there is no available CPU buffer. The method further includes the steps of setting, in the CPU processing module, an appropriate bit in the class of service bitmap when there is no available CPU buffer for at least one of the plurality of channels and transmitting the class of service bitmap to the memory management unit.

According to another aspect of the invention, there is provided an apparatus for processing packets on a network device. The apparatus includes receiving means for receiving packets in a memory management unit that identifies a class of service to which each packet belongs and for transmitting the packet to a CPU through a CPU processing module. The apparatus also includes sorting means for sorting the packets, in the CPU processing module, according to the class of service to which the packet belongs. The apparatus further includes storing means for storing each packet, in the CPU processing module, in an associated one of the plurality of channels, using a per channel bit associated with each of the plurality of channels to determine how to process packets in each for the plurality of channels for which there is no available CPU buffer and setting means for setting, in the CPU processing module, an appropriate bit in the class of service bitmap when there is no available CPU buffer for at least one of the plurality of channels and transmitting the class of service bitmap to the memory management unit.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
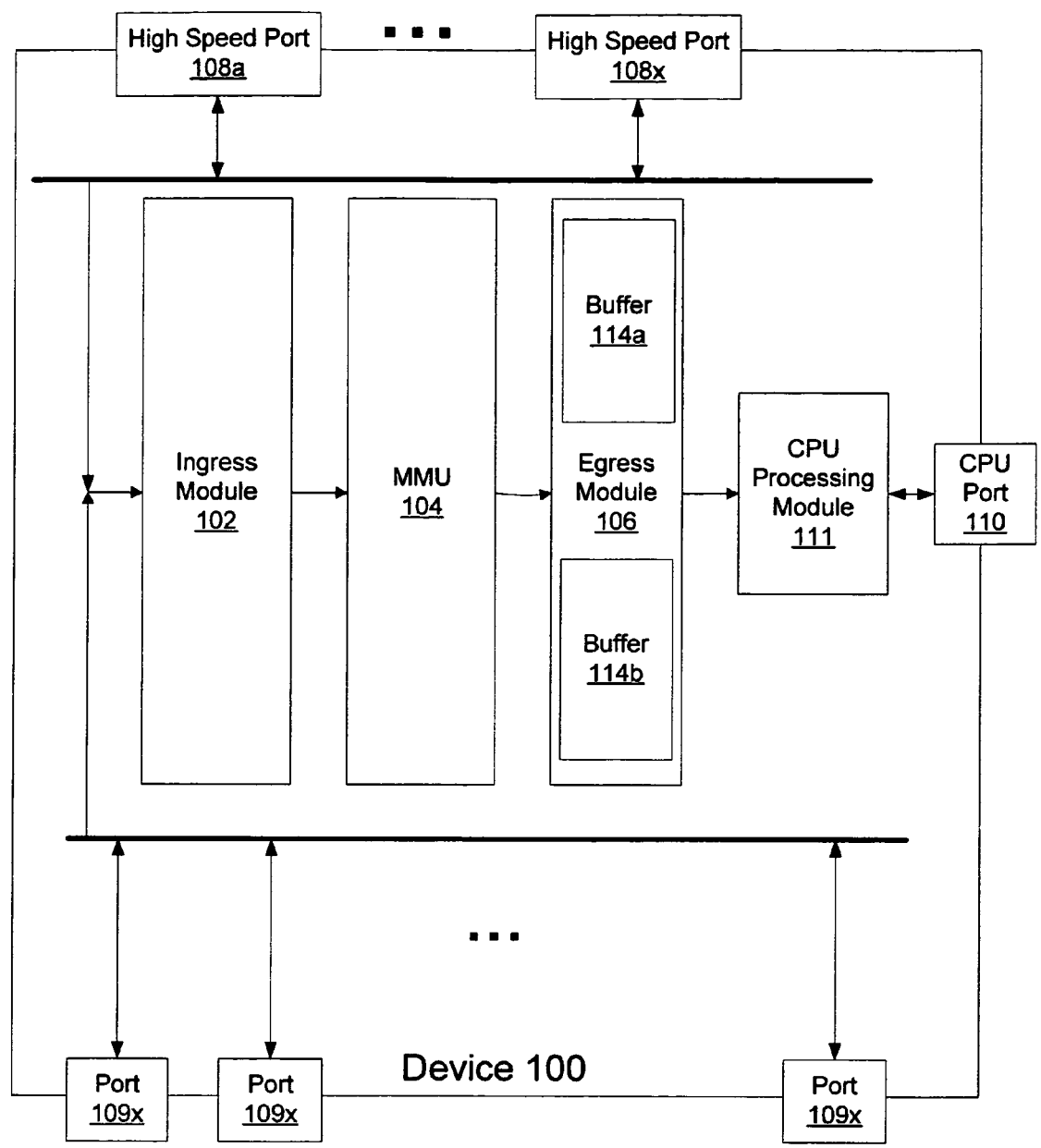
FIG. 1 illustrates a network device in which an embodiment the present invention may be implemented.

FIG. 1 illustrates a network device, such as a switching chip, in which an embodiment the present invention may be implemented. Device 100 implements a pipelined approach to process incoming packets and includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module.

Device 100 may also include one or more internal fabric ports (HiGig) ports 108a-108x, one or more external Ethernet ports 109a-109x, and a CPU port 110. Internal fabric ports 108a-108x are used to interconnect various devices in a system and thus form an internal fabric for transporting packets between external source ports and one or more external destination ports. As such, internal fabric ports 108a-108x are not externally visible outside of a system that includes multiple interconnected devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC module, which interfaces with a PCI bus that connects device 100 to an external CPU.

Network traffic enters and exits device 100 through external Ethernet ports 109a-109x. Specifically, packets in device 100 are routed from an external Ethernet source port to one or more unique destination Ethernet ports. Upon receiving packets from external Ethernet port 109a-109i, ingress module 102 performs switching functionality on each incoming packet and passes the packet to MMU 104. Depending on the COS associated with the packet, MMU 104 stores each packet in one COS buffer and performs resource checks on the packet. MMU 104 then forward the packet to egress module 106 where packet modification is performed on the packet and it is transmitted to at least one destination port. In an embodiment, egress module 106 includes two 128 byte buffers 114a-114b for storing packet from MMU 104. For packets that are to be transmitted to CPU port 110, egress module 106 transmits the packets of different classes on a single bus to CPU processing module 111. CPU processing module 111 thereafter uses the COS associated with each packet to sort the packets from egress module 106. After the packets are sorted, CPU processing module 111 then forwards the packets to PCI buffers in the CPU via port 110.

According to one embodiment of the invention, CPU processing module 111 uses the COS associated with each packet to assign the packet to a predefined priority level. In one embodiment, there are eight COS, in MMU 104, each of which is assigned to a predefined priority level in CPU processing module 111.

Figure 2:
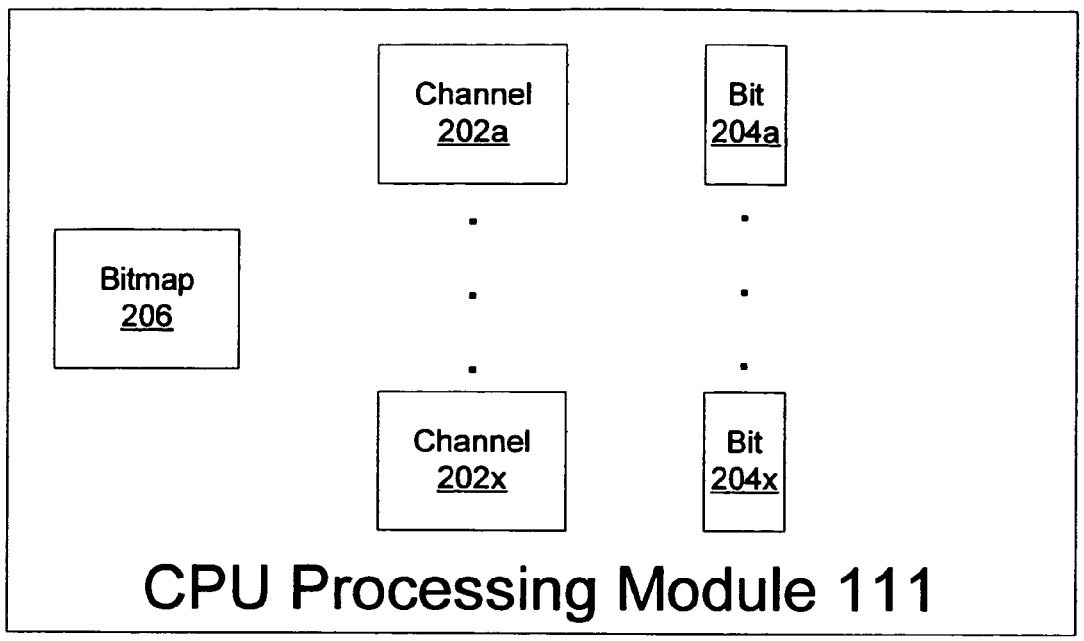
FIG. 2 illustrates an embodiment of a CPU processing module.

FIG. 2 illustrates an embodiment of CPU processing module 111. CPU processing module 111 includes multiple channels 202a-202x, each of which is used to store packets associated with a specific COS. Each channel 202a-202x is associated with a predefined priority level. In one embodiment of the invention, there may be up to four priority levels in CPU processing module 111. Each channel 202a-202x is also associated with a CPU buffer/memory location that is assigned the same priority level as the channel. CPU processing module 111 also includes a per-channel bit 204a-204x, each of which is associated with one channel 202a-202x. CPU processing module 111 uses per-channel bit 204 to determine how to process an incoming packet for which there is no available buffer on the CPU. According to an embodiment, each per-channel bit 204 may be set to "block" or "drop" packets. If a per-channel bit 204 for a given channel 202a-202x is set to block packets, CPU processing module 111 blocks all packet associated with that channel from being transmitted to the associated CPU buffer when there is no available slot in the associated CPU buffer. CPU processing module 111 blocks CPU transmission of those packets until the software on the CPU clears the associated buffer and the CPU requests more packets from the associated channel from CPU processing module 111. If a per-channel bit 204 for a given channel 202a-202x is set to drop packets, CPU processing module 111 drops all packets associated with that channel when there are no available associated CPU buffer slot. CPU processing module 111 continues to drop packets associated with that channel until the software on the CPU clears the buffer and the CPU request packets associated with the drop channel from CPU processing module 111. This enables CPU processing module 111 to drop lower priority/low COS packets if there are higher priority/COS buffers available on the CPU.

In order to prevent CPU processing module 111 from dropping too many lower priority packets, CPU processing module 111 also includes a 8-bit COS bitmap 206. CPU processing module 111 uses COS bitmap 206 to inform MMU 106 when a channel and/or associated CPU buffer is full. When CPU processing module 111 wants to prevent MMU 104 from sending packets associated with certain COS/priority level, CPU processing module 111 sets the appropriate bit for that COS and sends bitmap 206 to MMU 104. MMU 104 then uses bitmap 206 to schedule packets that are to be transmitted to CPU processing module 111. For example, if CPU processing module 111 determines that the CPU does not have any buffer slots for packets associated with a first class of service, CPU processing module 111 can use bitmap 206 to instruct MMU 104 to send packets associated with all COS except the first COS. MMU 104 thereafter uses the information from bitmap 206 to make scheduling decisions, wherein MMU 104 sends CPU packets to egress module 106 for only those COS that CPU processing module 111 can currently accept. If CPU processing module 111 sets the bitmap for all COS, MMU 104 will not send any packets to egress module 106 until CPU processing module 111 indicates that there is available buffer on the CPU for packets associated with one or more COS. Once the previously full PCI buffer that is associated with a COS becomes available, CPU processing module 111 clears the associated bit for that COS and sends bitmap 206 to MMU 104. This allows MMU 104 to schedule packets with the COS for transmission to CPU processing module 111.

Furthermore, in order to prevent CPU processing module 111 from dropping too many lower priority packets, the portions of the CPU memory associated with each of channels 202a-202x include descriptors for each packet or part thereof. For example, software processing the CPU memory could set up 100 descriptors for 100 packets in an associated portion of the CPU memory. According to an embodiment of the invention, the software could also set a special bit in a predefined descriptor, which indicates that all of the available space in the associated portion of the CPU memory is about to be used. Continuing with the example above, the software could therefore set the special bit in the $95^{th}$ descriptor to indicate that all of the space for the 100 packets is about to be unavailable. Accordingly, when the $95^{th}$ packet is sent to the CPU memory, the special bit is transmitted to CPU processing module 111 which sets the appropriated COS bit 206 for channel 202a-202x associated with the special bit and sends bitmap 206 to MMU 104. MMU 104 then uses bitmap 206 to stop scheduling packets for the associated COS. As is apparent, there may be packets in transit from egress module 106. However, the special bit may be set such that there is enough space in the CPU memory to process these packets.

According to an embodiment of the invention CPU processing module 111 will wait a predetermined amount of time after receiving the special bit before setting bitmap 206. This predetermined time should be no more than the egress module 106 plus CPU processing module 111 latency for three to four packets. As such, the special bit can be set at different descriptor offsets for different devices. For devices with a short egress module 106 plus CPU processing module 111 latency, the offset may be set to a small number, for example at the $95^{th}$ descriptor. For devices with larger egress module 106 plus CPU processing module 111 latency, the offset may be set to a higher number, for example at the $85^{th}$ descriptor. The inventive system therefore lowers the number of lower priority packets that are dropped and prevents higher priority packets from blocking lower priority packets.

After MMU 104 processes the packets, MMU 104 transmits 128 bytes to egress module 106 for storage in buffers 114a-114b. Thereafter, egress module 106 modifies the packets and transmits 32 bytes to CPU processing module 111 for storage in one of channels 202a-202x. When buffers 114a-114b in egress module 106 become available, egress module 106 sends a cell request to MMU 104 and MMU 104 transmits 128 bytes to the available buffer. Similarly, when buffers 202a-202x become available, CPU processing module 111 sends a cell request to egress module 106 and it transmits 32 bytes to the available buffer in CPU processing module 111.

Figure 3:
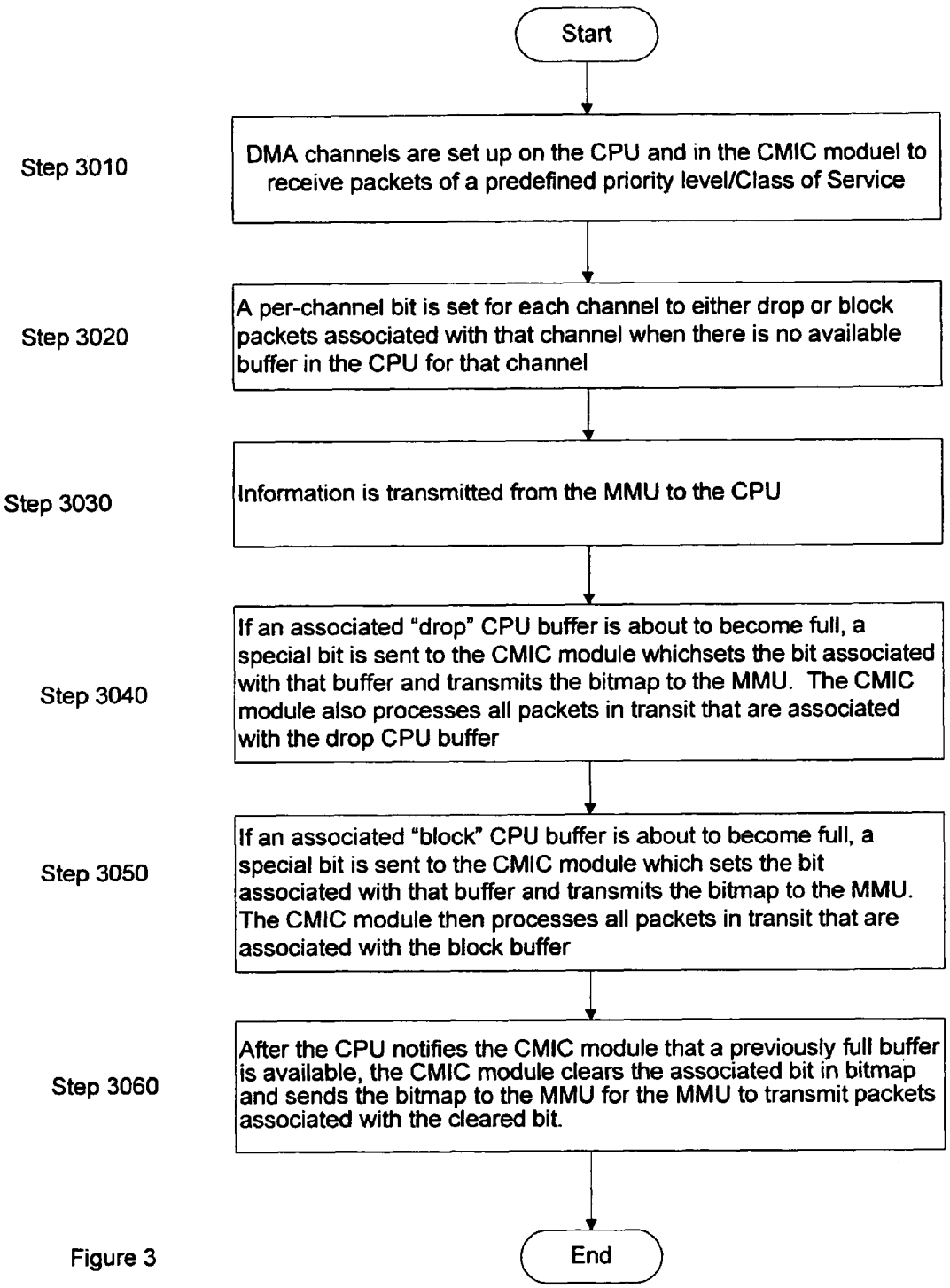
FIG. 3 illustrates the steps implemented in an embodiment of the present invention.

FIG. 3 illustrates the steps implemented in an embodiment of the present invention. In Step 3010, direct memory access channels 202a-202x are set up on the CPU and CPU processing module 111 to receive packets of an associated priority. For example, channel 202a may be set up to receive lower priority packets associated with COS 0-3 and channel 202x may be set up to receive higher priority packets associated with COS 4-8. In Step 3020, per-channel bit 204a for channel 202a is set to "drop" and per-channel bit 204x for channel 204x is set to "block." In Step 3030, information from MMU is transmitted to CPU processing module 111, through egress module 106, and thereafter to the CPU. In Step 3040, when the associated CPU buffer is about to become full, software associated with the CPU buffer sends a special bit to CPU processing module 111 which sets a bit in bitmap 206 that is associated with COS 0-3. CPU processing module 111 processes any packets associated with COS 0-3 that were in transit from MMU 104 to CPU processing module 111 after receiving the special bit. This causes MMU 104 to stop sending any packets for COS 0-3 to CPU processing module 111. However, MMU 104 continues to send and CPU processing module 111 continues to accept and transmit packets associated with COS 4-8 to the CPU. In Step 3050, if the buffer associated with channel 202x is about to become full, software associated with the CPU buffer sends a special bit to CPU processing module 111 which sets a bit in bitmap 206 that is associated with COS 4-8 and processes all packets that were in transit from MMU 104 to CPU processing module 111 after the buffer associated with channel 202x became full. Step 3050 causes MMU 104 to stop sending all packets for COS 4-8 to CPU processing module 111. However, MMU continues to send and CPU processing module 111 continues to accept and block packets associated with COS 0-3. In Step 3060, after the software on the CPU clears the associated PCI buffer that was previously full, the software notifies CPU processing module 111 and it clears the associated bit in bitmap 206. CPU processing module 111 then sends bitmap 206 to MMU 104 for MMU 104 to transmit packets associated with the cleared bit.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. An apparatus, comprising:
    a Central Processing Unit (CPU) Management Interface Controller (CMIC) configured to transmit packets between at least a portion of the apparatus and a CPU using a plurality of channels, and the CMIC comprising:
        a class of service bitmap associated with the plurality of channels, and
        the plurality of channels, wherein each of the plurality of channels is associated with at least one class of service, includes a per channel bit, is configured to store one or more packets, and is assigned a priority level,
    wherein the CMIC is further configured to
        sort packets according to the class of service to which the packet belongs,
        store each packet in an associated one of the plurality of channels,
        use the per channel bit to determine how to process packets in each of the plurality of channels for which there is no available CPU buffer, and
        when there is no available CPU buffer for one of the plurality of channels, set an appropriate bit in the class of service bitmap and transmit the class of service bitmap to a memory management unit.

2. The network device of claim 1, wherein the CMIC is further configured to assign each of the plurality of channels to one of four priority levels.

3. The network device of claim 1, wherein the CMIC is further configured to associate each of the plurality of channels with a buffer location of the CPU, wherein the buffer location is assigned the same priority level as an associated channel and, when a predefined amount of the buffer location is filled a special bit is sent to the CMIC to trigger that there is no available CPU buffer for an associated one of the plurality of channels.

4. The network device of claim 1, wherein the CMIC is configured to set the per channel bit for each of the plurality of channels to one of a block bit or a drop bit.

5. The network device of claim 4, wherein when the per channel bit for one of the plurality of channels is set to the drop bit, the CMIC is configured to drop all packets for the one of the plurality of channels when there is no available associated CPU buffer.

6. The network device of claim 4, wherein when the per channel bit for one of the plurality of channels is set to the block bit, the CMIC is configured to block all packets for the one of the plurality of channels from being transmitted to a CPU when there is no available associated CPU buffer.

7. The network device of claim 1, wherein the CMIC is further configured to use the class of service bitmap to inform a memory management unit when a CPU buffer associated with one of the plurality of channels is full.

8. The network device of claim 1, further comprising:
a memory management unit configured to use the class of service bitmap to schedule packets that are to be transmitted to a CPU.

9. The network device of claim 1, wherein the CMIC is further configured to receive the packets through an egress module, wherein the egress module is configured to send a cell request when buffers on the egress module are available.

10. The network device of claim 9, wherein the CMIC is further configured to send a cell request to the egress module when at least one of the plurality of channels included by the CMIC becomes available.

11. A method, comprising
receiving packets;
identifying a class of service to which each packet belongs;
sorting the packets according to the class of service to which the packet belongs;
storing each packet, in an associated one of a plurality of channels, wherein the plurality of channels is included by a Central Processing Unit (CPU) Management Interface Controller (CMIC) configured to transmit packets to a CPU using the plurality of channels;
setting an appropriate bit in a class of service bitmap when there is no available CPU buffer for at least one of the plurality of channels;
employing a respective per channel bit in the class of service bitmap to determine how to process packets in each of the plurality of channels when there is no available CPU buffer; and
transmitting the class of service bitmap to a memory management unit.

12. The method of claim 11, further comprising assigning one of four priority levels to each of the plurality of channels.

13. The method of claim 11, further comprising associating each of the plurality of channels with a buffer location of the CPU, wherein the buffer location is assigned a same priority level as an associated channel and, when a predefined amount of the buffer location is filled, a special bit is sent to the CMIC to trigger that there is no available CPU buffer for an associated one of the plurality of channels.

14. The method of claim 11, further comprising setting the per channel bit for each of the plurality of channels to one of a block bit or a drop bit.

15. The method of claim 14, further comprising dropping, by the CMIC, all packets associated with one of the plurality of channels when there is no available associated CPU buffer and the per channel bit for that channel is set to the drop bit.

16. The method of claim 14, further comprising blocking, by the CMIC, all packets associated with one of the plurality of channels from being transmitted to the CPU when there is no available associated CPU buffer and the per channel bit for that channel is set to the block bit.

17. The method of claim 11, further comprising using, by the CMIC, a class of service bitmap to inform the memory management unit when a CPU buffer associated with one of the plurality of channels is full.

18. The method of claim 11, further comprising using, by a memory management unit, a class of service bitmap to schedule packets that are to be transmitted to a CPU.

19. The method of claim 11, further comprising receiving packets at the CMIC through an egress module, wherein the egress module sends a cell request to the memory management unit when buffers on the egress module are available and the CMIC sends a cell request to the egress module when at least one of the plurality of channels on the CMIC becomes available.

20. An apparatus, comprising
receiving means for:
receiving packets, and
identifying a class of service to which each packet belongs:
sorting means for sorting the packets according to the class of service to which the packet belongs;
storing means for:
storing each packet in an associated one of a plurality of channels,
using a per channel bit associated with each of the plurality of channels to determine how to process packets in each of the plurality of channels when there is no available storage space in a respective Central Processing Unit (CPU) buffer, and
wherein processing includes, if there is available storage space in a CPU buffer, employing a CPU Management Interface Controller (CMIC) to transmit one or more packets between at least a portion of the apparatus and a CPU using one of the plurality of channels;
setting means for setting an appropriate bit in a class of service bitmap when there is no available CPU buffer for at least one of the plurality of channels; and
transmitting means for transmitting the class of service bitmap to a memory management unit.

* * * * *

UNITED STATES PATENT AND TRADEMARK OFFICE
CERTIFICATE OF CORRECTION

PATENT NO. : 7,830,887 B2
APPLICATION NO. : 11/082975
DATED : November 9, 2010
INVENTOR(S) : Vamsi Tatapudi et al.

Page 1 of 1

It is certified that error appears in the above-identified patent and that said Letters Patent is hereby corrected as shown below:

In column 7, line 6, in claim 3, delete "filled" and insert -- filled, --, therefor.

In column 8, line 38, in claim 20, delete "belongs:" and insert -- belongs; --, therefor.

Signed and Sealed this
Fifteenth Day of February, 2011

David J. Kappos
*Director of the United States Patent and Trademark Office*